UNITED STATES PATENT OFFICE.

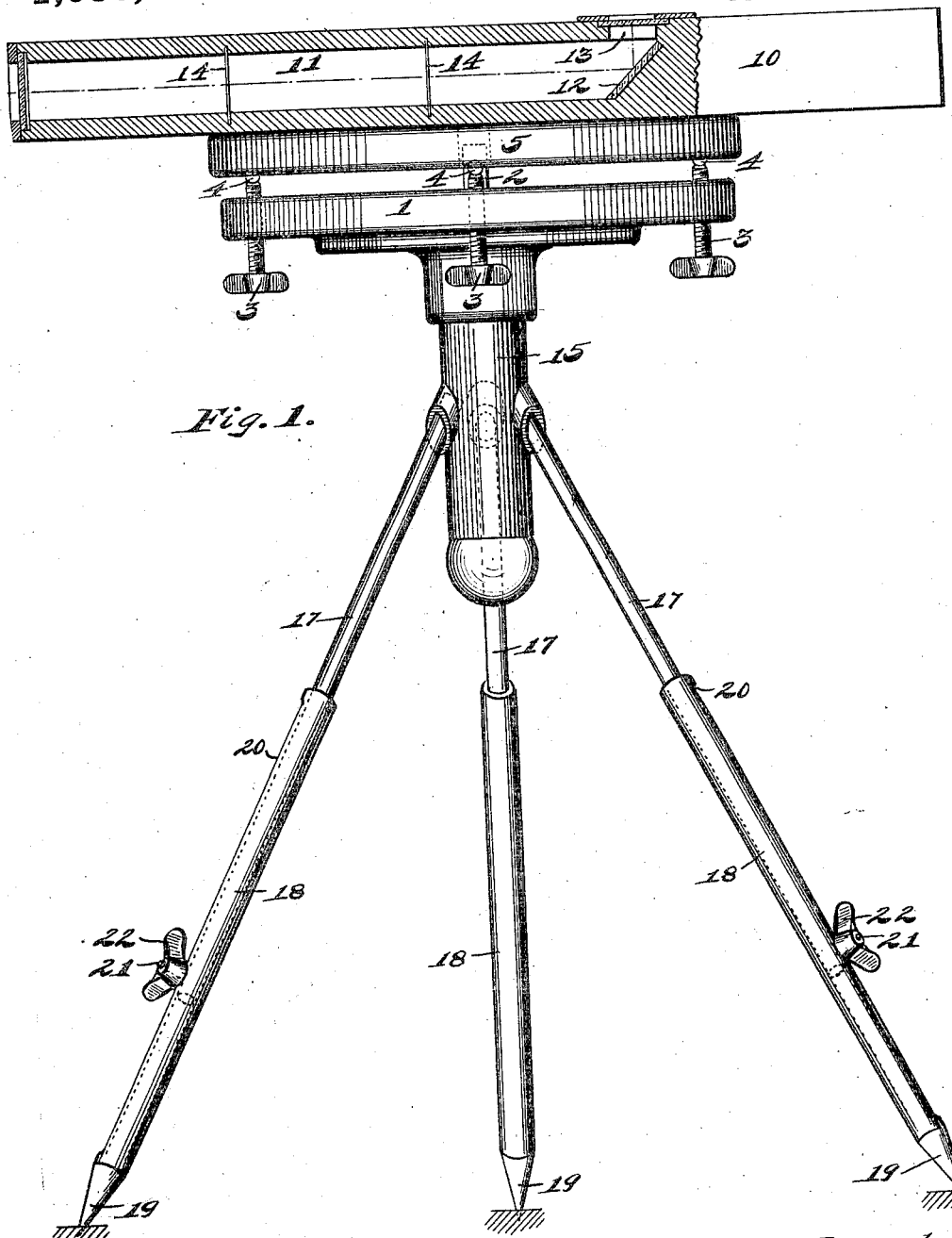

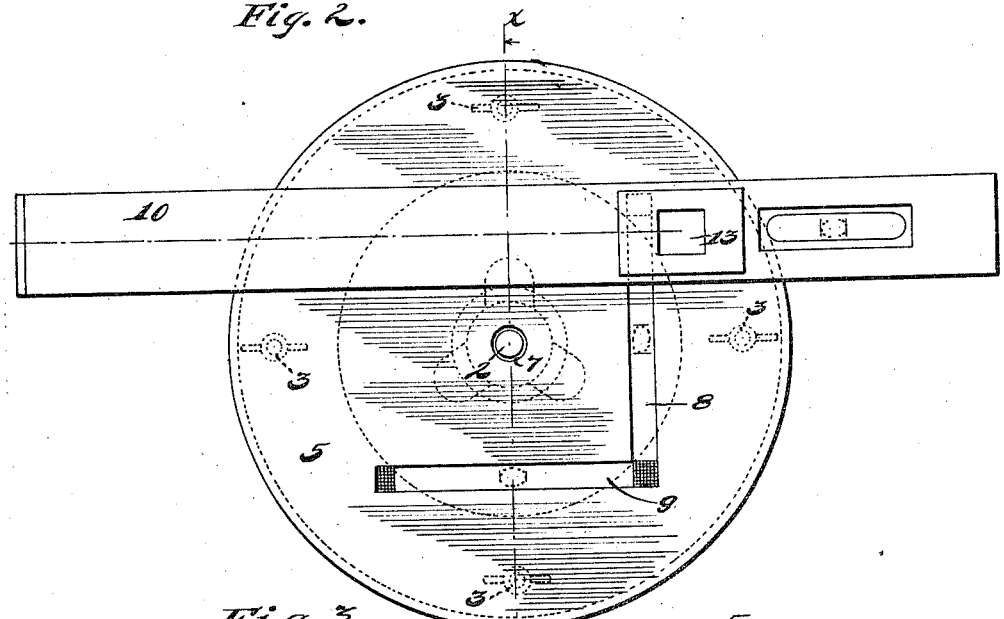
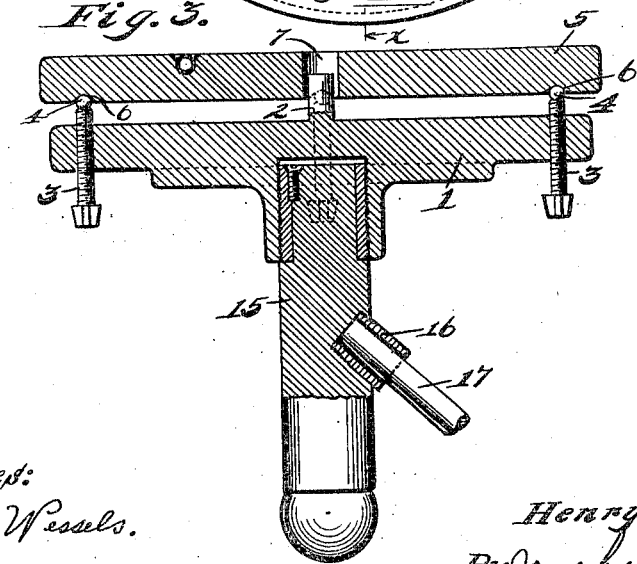

HENRY STAMPS, OF CHICAGO, ILLINOIS.

LEVEL-STAND.

1,030,938.

Specification of Letters Patent.    Patented July 2, 1912.

Application filed December 27, 1910. Serial No. 599,491.

*To all whom it may concern:*

Be it known that I, HENRY STAMPS, a citizen of the United States, and a resident of the city of Chicago, county of Cook, and State of Illinois, have invented certain new and useful Improvements in Level-Stands, of which the following is a specification.

My invention relates to improvements in level stands and has for its object the provision of a level stand of simple construction and efficient in operation.

My invention consists in the combination and arrangement of parts hereinafter described and claimed.

My invention will be best understood by reference to the accompanying drawings forming a part of the specification, and in which, Figure 1 is an end elevation of a level stand embodying my invention and showing a leveling tube partially in section supported thereon, Fig. 2 is a top plan view corresponding to Fig. 1, and Fig. 3 is a section on line x—x of Fig. 2 with the level omitted.

The preferred form of construction as illustrated in the drawings comprises a lower supporting table 1 provided with an upwardly extending central pin 2. Upwardly extending leveling screws 3 are threaded in said table at points equally distant from the center of said table and from each other, in other words at the four corners of a square having the center of said table as its center. An upper supporting table 5 is supported on the upper ends of screws 3, recesses 6 being formed in the bottom thereof for the reception of the balls 4 and said upper table is provided with a center aperture 7 adapted to fit over pin 2 as shown. Supporting table 5 is provided with leveling glasses or tubes 8 and 9 arranged at right angles to each other and parallel to lines connecting opposite screws 3. By use of screws 3 and leveling glasses 8 and 9, it will be seen, that table 5 may be readily brought to a true level the relative arrangement of said tubes and screws materially assisting in this.

The stand is designed for use in conjunction with a leveling tube 10 having a sighting channel 11 therein which is provided at its inner end with an inclined mirror 12 arranged under a sight opening 13 as shown. Frames 14 containing alining cross hairs are arranged in tube 11 for assisting in taking a sight which, it will be observed, is taken from above tube 10 with said tube resting upon supporting table 5.

Supporting table 1 is provided with a downwardly extending central stand 15 threaded thereto as indicated. Stand 15 carries three equal spaced downwardly extending tapered sockets 16 threaded therein as shown. The upper portions 17 of supporting legs are nicely fitted to these sockets at their upper ends and at their lower ends telescope tubes 18 which constitute the lower portions of the supporting legs and are provided with points 19 for engagement with the ground. Each of the tubes 18 is provided with a longitudinal slot 20 and each of the leg portions 17 is provided with a threaded bolt 21 extending outwardly through said slot and carrying a winged nut 22 adapted to clamp said leg portions in adjusted positions. With this construction it will be observed that the supporting legs may be readily removed and collapsed for packing into small space.

While I have illustrated and described the preferred form of construction for carrying my invention into effect this is capable of variation or modification without departing from the spirit of the invention. I, therefore, do not wish to be limited to the exact details set forth, but desire to avail myself of such variations and modifications as come within the scope of the appended claim.

Having described my invention what I claim as new and desire to secure by Letters Patent is:

A level stand comprising a lower supporting table; leveling screws threaded in said table and projecting upwardly therefrom, said screws being provided with balls at their upper ends; a pin extending upwardly from the center of said table; an upper supporting table loosely resting upon said balls, and having a central aperture loosely fitting over said pin, depressions in the bottom thereof receiving said balls and said pin extending but part way through said aperture, the arrangement being such that the upper supporting table is entirely free for ready removal from said lower table; and leveling tubes set in the upper surface of said upper table at right angles to each other, substantially as described.

In testimony whereof I have signed my name to this specification in the presence of two subscribing witnesses.

HENRY STAMPS.

Witnesses:
 FLORENCE E. LILLIS,
 JOSHUA R. H. POTTS.